US012646273B2

(12) United States Patent
Whatmore

(10) Patent No.: US 12,646,273 B2
(45) Date of Patent: Jun. 2, 2026

(54) IMAGE GENERATOR AND METHOD FOR AUGMENTED REALITY SYSTEM

(71) Applicant: BAE SYSTEMS plc, London (GB)

(72) Inventor: Robert Whatmore, Rochester (GB)

(73) Assignee: BAE SYSTEMS PLC, London (GB)

( * ) Notice: Subject to any disclaimer, the term of this patent is extended or adjusted under 35 U.S.C. 154(b) by 167 days.

(21) Appl. No.: 18/690,008

(22) PCT Filed: Sep. 8, 2022

(86) PCT No.: PCT/GB2022/052284
§ 371 (c)(1),
(2) Date: Mar. 7, 2024

(87) PCT Pub. No.: WO2023/037113
PCT Pub. Date: Mar. 16, 2023

(65) Prior Publication Data
US 2025/0131666 A1 Apr. 24, 2025

(30) Foreign Application Priority Data

Sep. 10, 2021 (EP) ..................................... 21275128
Sep. 10, 2021 (GB) ..................................... 2112899

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01)

(58) Field of Classification Search
None
See application file for complete search history.

(56) References Cited

U.S. PATENT DOCUMENTS

2010/0103178 A1* 4/2010 Song ................... G06F 3/03545
345/473
2013/0044130 A1 2/2013 Geisner et al.
(Continued)

FOREIGN PATENT DOCUMENTS

BR 102012016248 A2 * 4/2015
KR 20190030938 A 3/2019
WO 2023037113 A1 3/2023

OTHER PUBLICATIONS

International Search Report and Written Opinion received for PCT/GB2022/052284. Mailed: Dec. 8, 2022. 13 pages.

*Primary Examiner* — Tapas Mazumder
(74) *Attorney, Agent, or Firm* — Arcane Law PLLC

(57) ABSTRACT

An image generation system and method for displaying an Augmented Reality "AR" image of a real-world environment having one of more objects located therein and one or more AR objects each corresponding to a respective object, the system comprising: a display on which the image of the real-world environment and the AR objects are displayed; a processing and control module configured to: receive, from one or more sensors, data relating to the real-world environment and objects therein; create the one or more AR objects from the objects by determining additional information relating to the object which is represented by at least one of symbols, annotations and fonts to be attached to the AR object to act as a displayed component: displaying the AR image comprising the real-world image and one or more AR objects; wherein the AR objects once created are stored for future retrieval based on a unique identifier for the AR object which remains active as long as the object is of interest.

20 Claims, 7 Drawing Sheets

(56) References Cited

U.S. PATENT DOCUMENTS

| | | | |
|---|---|---|---|
| 2015/0254905 A1 | 9/2015 | Ramsby et al. | |
| 2016/0247324 A1* | 8/2016 | Mullins | G02B 27/0179 |
| 2016/0341961 A1 | 11/2016 | Mullins et al. | |
| 2018/0089899 A1 | 3/2018 | Piemonte et al. | |
| 2021/0390766 A1* | 12/2021 | Schouela | G06F 3/011 |

* cited by examiner

START 600

RECEIVE PLATFORM LOCATION & ORIENTATION FROM SENSORS 602

RECEIVE CURRENT HEAD POSE FROM THE HMD 604

RECALCULATE AR OBJECT POSITIONS 606

DRAW OBJECTS ON EACH VIEW & LAYER IN ORDER OF PRIORITY 608

APPLY WARP LAYERS 610

DISPLAY RESULTANT IMAGE 612

IMAGE GENERATOR AND METHOD FOR AUGMENTED REALITY SYSTEM

FIELD

The present invention relates to an image generator and method for an augmented reality system.

BACKGROUND

There are many different systems and methods used to provide an Application Programming Interface (API) to develop and drive Augmented Reality (AR) applications. Many of these types of systems operate under licenses which provide restrictions and can give rise to the systems becoming obsolescent or unsupported. In addition, the nature of the proprietary systems are not adapted for flexible manipulations of images and data in a complex augmented reality system.

As a result, there is a need for an improved and flexible way to develop an AR application which overcomes at least some of the problems associated with known systems.

SUMMARY

According to an aspect of the present invention, there is provided an image generation system for displaying an Augmented Reality "AR" image of a real-world environment having one of more objects located therein and one or more AR objects each corresponding to a respective object, the system comprising: a display on which the image of the real-world environment and the AR objects are displayed; a processing and control module configured to: receive, from one or more sensors, data relating to the real-world environment and objects therein; create the one or more AR objects from the objects by determining additional information relating to the object which is represented by at least one of symbols, annotations and fonts to be attached to the AR object to act as a displayed component: displaying the AR image comprising the real-world image and one or more AR objects; wherein the AR objects once created are stored for future retrieval based on a unique identifier for the AR object which remains active as long as the object is of interest.

In an aspect the stored AR object enters a Field Of View "FOV" of the display, the stored AR object is retrieved for display based on the unique identifier.

In an aspect the AR object is represented in the AR image by just the additional information.

In an aspect the real-world image is displayed with one or more AR objects and the one or more AR objects are positioned to coincide with the respective object.

In an aspect multiple AR objects are displayed with the real-world image.

In an aspect the AR object is associated with at least one of a display surface or a layer.

In an aspect the real-world image is displayed by overlaying at least one of the display surface or the layer to form an AR image.

In an aspect the at least one of the display surface comprises a display screen onto which multiple layers are added.

In an aspect the layers are containers for objects and are added to the display In an aspect the layers comprises one of a world-stabilised layer; a platform/body-stabilised layer and a display/head-stabilised layer.

In an aspect one or more layers are switched off to change the appearance of the AR image.

In an aspect AR objects are combined to form complex AR objects.

In an aspect the AR object is updated whenever the corresponding object changes.

In an aspect the system further comprising a library module for storing known AR objects and new AR objects, wherein the AR objects are retrieved from the library.

According to an aspect of the present invention, there is provided a method for displaying an Augmented Reality "AR" image of a real-world environment having one of more objects located therein and one or more AR objects each corresponding to a respective object, the method comprising: displaying an image of the real-world environment and the AR objects; receiving, from one or more sensors, data relating to the real-world environment and objects therein; creating the one or more AR objects from the objects by determining additional information relating to the object which is represented by at least one of symbols, annotations and fonts to be attached to the AR object to act as a displayed component: displaying the AR image comprising the real-world image and one or more AR objects; wherein the AR objects once created are stored for future retrieval based on a unique identifier for the AR object which remains active as long as the object is of interest.

In an aspect the method further comprising retrieving a stored AR object for display based on the unique identifier when the stored AR object enters a Field Of View "FOV" of the display.

In an aspect the method further comprising representing the AR object in the AR image by just the additional information.

In an aspect the method further comprising displaying the real-world image with one or more AR objects positioned to coincide with the object.

In an aspect the method further comprising displaying multiple AR objects with the real-world image.

In an aspect the method further comprising forming the AR object with at least one of a display surface or a layer.

In an aspect the method further comprising displaying the real-world image by overlaying at least one of the display surface or the layer to form the AR image.

In an aspect the method further comprising the display surface forming a display screen onto which multiple layers are added.

In an aspect the method the layers are containers for objects the method further comprising adding layers to the display surface in any order and in any quantity.

In an aspect the method the layers comprises one of a world-stabilised layer; a platform/body-stabilised layer and a display/head-stabilised layer.

In an aspect the method further comprising switching off one or more layers to change the appearance of the AR image.

BRIEF DESCRIPTION OF THE FIGURES

Embodiments of the invention will now be described by way of example only with reference to the figures, in which.

DETAILED DESCRIPTION

The present invention relates to an image generation system and method for an augmented reality system for displaying a scene (which is real or imaginary) on a display which can be used to determine positions of objects and what these objects are, to enable a detailed clear representation of a given environment for a user. The objects once identified are displayed with additional information when they in the Field of View (FOV) of the display. A user is thus provided with a clear image of a scene and what is in the scene. The additional information includes symbology and other information which enriches the details of the scene. In addition, supplementary features such as maps, videos and three dimensional (3D) objects can be added to the displayed image. This will be further described below.

Figure 1:
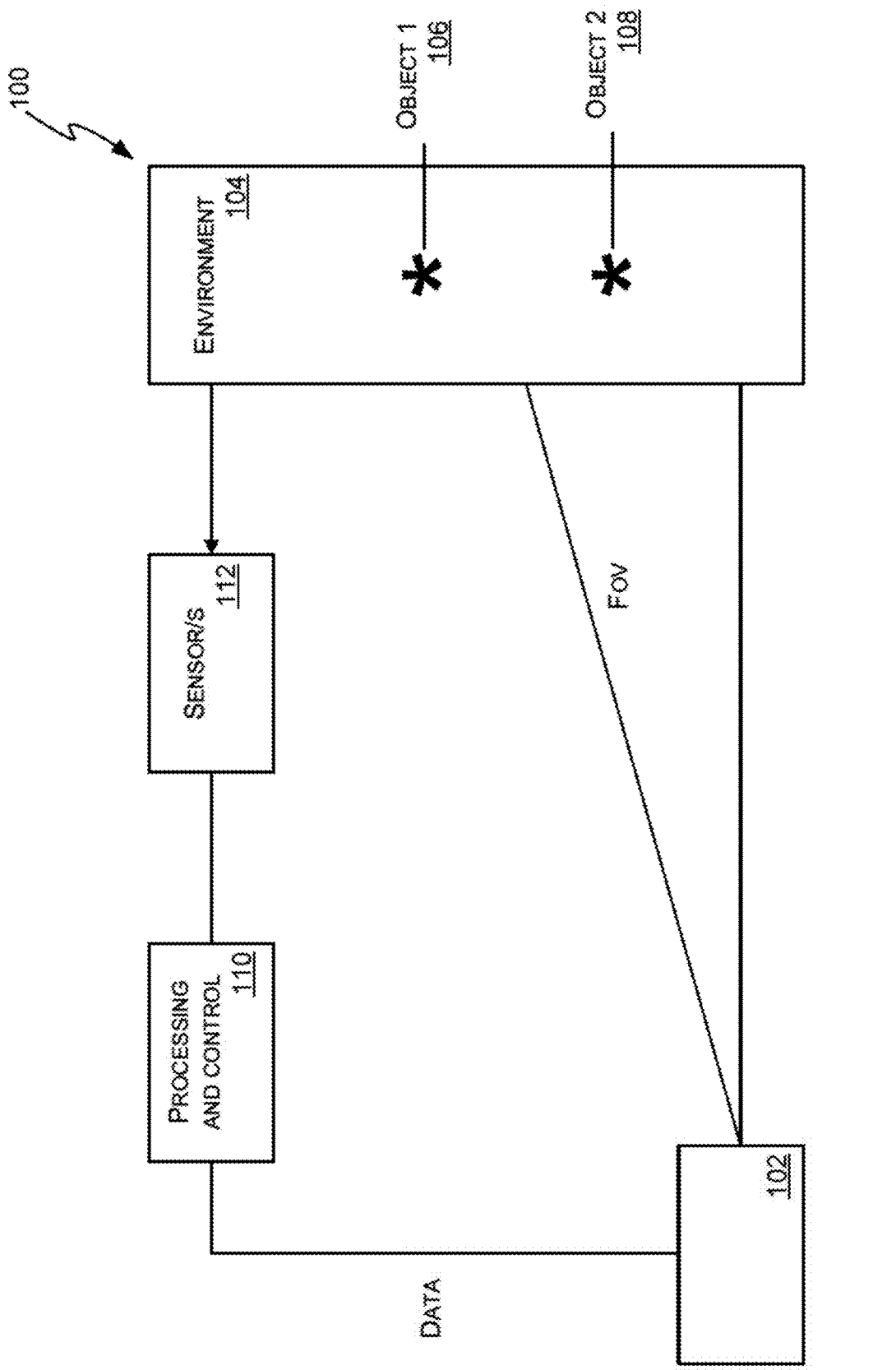
FIG. 1 shows a simplified block diagram of an AR system, according to the present invention.

FIG. 1 illustrates a computer system (not shown) on which an image generation system (or image generator) shown generally as 100 is enabled. The system 100 includes an augmented reality display 102. The augmented reality display 102 includes any one of a head mounted display (HMD), AR glasses, a heads up display (HUD) or any appropriate display unit depending on the circumstances. The image in the AR display is configured to be viewed by a user in use. The AR display 102 is arranged to view an environment 104 in which multiple AR objects 106, 108 may be found. The AR display has a FOV in which the AR objects 106, 108 may or may not be located. The FOV is moveable based on either movement of the user; on other effects on the environment or objects; and additional information provided via the system or sensors. The system includes a processing and control module 110 which provides data to the AR display from sensors 112 which are collecting information from the objects, the environment or from other sources (not shown).

The sensors include one or more of image sensors, audio sensors, IR or UV sensors, heat sensors, motion sensors, sensors for geographic or climatic metrics, sensors for electrical metrics, warning devices and any other relevant measuring or monitoring device.

The processing and control module is located in situ with the AR display 102 or elsewhere.

In operation, the system of FIG. 1 collects data from a variety of sources, including the sensors 112. The data is processed in the process and control module before being provided to the AR display where is presented to the user. The presentation may be in the form of images, audio, haptics, a combination thereof or any other appropriate medium.

In an aspect of the invention, the processing and control module 110 is used to set up and drive a display-only AR device (i.e., one without an on-board processing module). It achieves this by providing a set of APIs, used by a controlling application to create display surfaces which are referred to as "views" and AR objects to render on the views to realise an AR display. Once created, the AR objects are managed by a library and rendered in the correct positions on the AR device according to a platform/body and head orientation and position that is supplied by any external head tracking device (not shown).

The system further provides a flexible middleware layer which is free from outside obsolescence (e.g., changing versions of commercially-available tools) and abstracts away low-level graphics and device-specific functions. It also has the benefit of being able to use the same code for testing/integrating on a standard monitor or running on the AR device, without the use of an emulator.

The system gives rise to applications that improve situational awareness using conformal symbology, the design of the library is such that it can also be used to display static imagery (e.g., a browser interface, or video stream), a 3D virtual environment (e.g., a dashboard, or cockpit), or all three combined.

Figure 2:
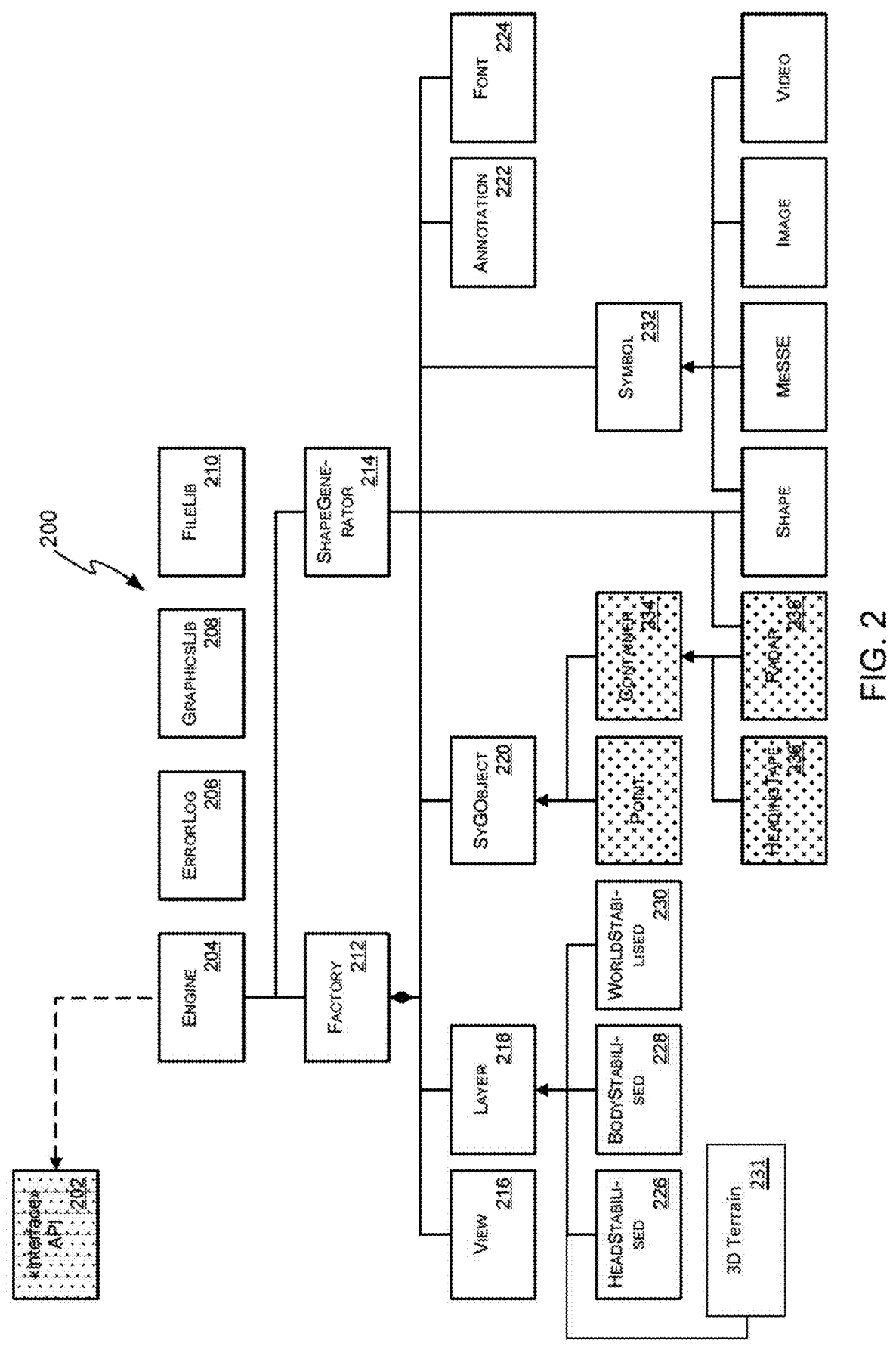
FIG. 2 shows a possible hierarchical architecture of the FIG. 1 system.

The system elements and process will now be described with reference to FIG. 2.

A symbology and graphics generator for AR system 200 includes an interface 202. The interface is driven by a system engine 204 and further includes an error logging module 206, a graphics library 208 and a file-handling library module 210.

The system engine 204 communicates with a system factory 212 and a shape generator 214. The system factory is used to generate views 216, layers 218, symbology 220, annotations 222 and fonts 224, these are collectively referred to as object attributes and it will be appreciated that the foregoing list is not limited to just these types of object. After processing, the resultant image gives rise to a display which comprises a number of views and layers containing symbology, annotations, or other attributes of the object. The layers overlap or overlay one another in such a way that the resultant image includes multiple AR objects overlaying a real-world scene including the objects in the FOV. The AR objects comprise symbology; further details of the object; their positions in the scene and any other additional information.

Views 216 are display screens onto which multiple layers 218 can be added, allowing monocular, binocular, and stereoscopic 3D (with interpupillary distance compensation) implementations to produce an image view to be combined with other views and layers as described below. In a binocular AR glasses concept, there is a view defined for each lens, though further views can be added for "repeater displays" (allowing other people to see what the user is seeing), for example. Each view can be controlled individually in terms of optical condition including visibility, brightness, wavelength, etc.

Layers 218 are containers for objects and can be added to the views 216 in any order and in any quantity. The layers 218 are rendered in the order of addition to the views 216-"high priority" layers should be added last so that they are drawn over the top of lower priority layers. Each layer 218 also has an optional background colour (defaulting to transparent) and a "clipping region" which constrains symbology to a rectangular section of the layer, hiding anything that falls outside of it. Individual layers 218 can be switched on or off for quick decluttering operations (removing all symbology on a specified layer), or perhaps switching between application modes (e.g., a calibration mode and an operational mode).

Layers 218 are created as one of four types, although this is not limited and may include others.

A first is a World-Stabilised layer 226, where the objects are rendered conformally with respect to a specified FOV and overlaying the represented position of the object in the real scene. When the head orientation is supplied to the system, the layer will automatically render the object in its new location on the display generally assuming this is in the FOV.

Figures 7A, 7B:
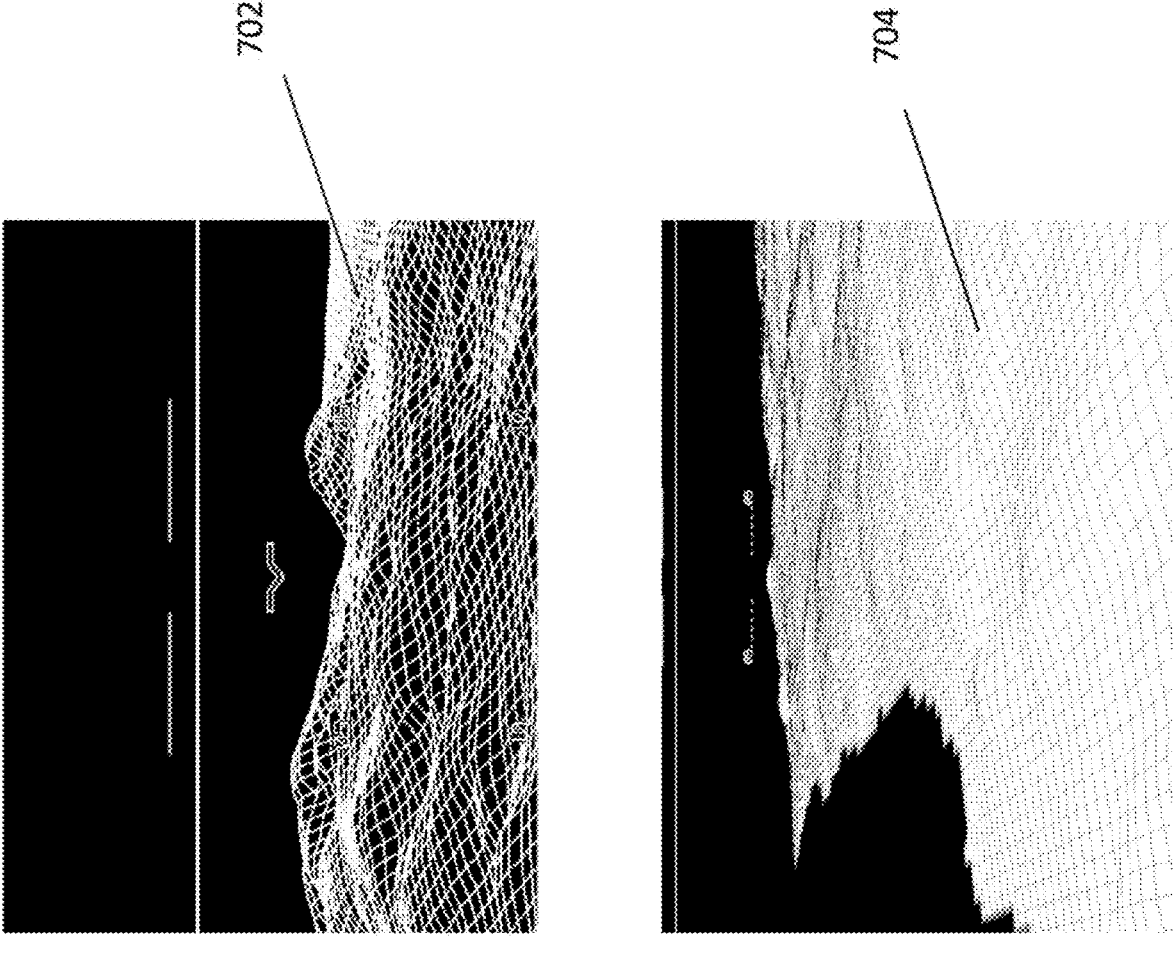
FIGS. 7a and 7b show a 3D terrain mesh.

There is also provided a 3D Terrain Layer 231. The 3D Terrain layer 231 displays a wireframe or solid 3D terrain mesh conformally with respect to a specified FOV (i.e. such that it overlays the real landscape it is representing). A wireframe mesh 702 is shown in FIG. 7*a*. A solid mesh 704 is shown in FIG. 7*b*.

The system can load surrounding terrain data (e.g. elevation data) as a grid of elevation spot heights from a predetermined source/format and thereby present the terrain mesh with respect to the current latitude, longitude and altitude of the user.

The system processor generates the terrain mesh as an array of discrete tile elements, which are world-stabilized. Further, when the user location moves from one tile to the next, the next row or column of tiles is automatically selected, loaded and displayed. (For example the user may step to the left and in so doing step across into another tile. On detecting this, the system would present a further row of tiles on the left hand side of the array, and remove a row of tiles on the right hand side of the display).

The 3D terrain layer has particular processing aspects. For example the tiled array which updates with movements, and the loading of elevation data to generate the mesh. Accordingly, in the present embodiment, the 3D terrain layer is kept as a layer independent of the other layers. Such independence can assist with the efficiency of the particular processing aspects.

In the present embodiment, the 3D terrain mesh is world stabilised, and as such can accentuate the contours of the visible terrain. Where visibility is poor, such a 3D terrain mesh can enable the user to see what would otherwise be hidden.

In alternative embodiments, where the 3D terrain is world-stabilised it could be a sub-layer within the world-stabilised layer for ease of switching in and out of the user's view.

In alternative embodiments, the 3D terrain mesh could be platform/body stabilised or head stabilised. In such embodiments, the terrain mesh would not conform its contours to those of the visible environment, but could still present topological data to the user in a convenient human-readable format, optionally in a scaled up or scaled down format.

A Platform/Body-Stabilised layer 228 is one in which the objects are rendered relative to the position of a user location (e.g., a virtual dashboard or cockpit, or 3D user interface). The system will automatically update the display based on the supplied head orientation combined with a supplied platform orientation (e.g., from vehicle sensors). In addition, it is possible to provide a mechanism to lock out the pitch or yaw components for a Body-Stabilised layer. When the pitch is locked, objects will move in the yaw and roll axes only, and similarly when yaw is locked, objects will only move in pitch and roll. A yaw lock could provide a 3D map image that is always in front of the wearer but only visible when they look down.

A Display/Head-Stabilised layer 230 is one in which objects are positioned using view co-ordinates and remain always-in-view regardless of where the wearer is looking. This type of layer is analogous to a standard monitor, and as such, could be used for normal 2D applications without utilising any of the AR components of the system.

AR Objects 220 hold the positional information for objects to be graphically represented in the AR application. An object can be added to multiple layers and, as such, holds three different position co-ordinates for the three layer types: latitude, longitude, and altitude; relative X, Y, Z metres; and X, Y pixels, for World-Stabilised, Body-Stabilised, and Head-Stabilised, respectively. In this way, the same object and its graphical representation can be displayed in three different ways, depending on the layer/s it is added to.

AR Objects 220 on their own are invisible, requiring one or more symbols 232 and/or annotations 222 and/or fonts 224 to be attached to act as the displayed component. Each object can be individually decluttered and controlled (rotated, moved, or scaled in size), which will affect every symbol and annotation attached to the object.

Additionally, objects can be added to system pre-defined "container" types 234 such as a heading tape 236 and a radar 238. When added to these containers, and the object has a latitude, longitude, and altitude position component, the object's attached symbols (or an optional alternative caret) will be rendered at the relative bearing on the heading tape, and relative bearing and altitude on the radar.

Objects can also be linked together to form compound objects. These can be assigned a type of line, area, or 3D "wall", with an associated line style and colours. When rendered, depending on the type selected and the layer type added to, the objects will be joined with a line, form a closed polygon, or draw a 3D shaded wall.

Symbols 240 are the graphical representations that are attached to objects and can be 2D or 3D primitive shapes (e.g., square, circle, cube, pyramid, or cylinder); raster, bitmap or vector symbols (loaded from a proprietary format file); images; or video frames. Multiple symbols of any combination of types can be attached to a single object, and the same symbol can be attached to multiple objects. Symbols hold their own colour, rotation, size and position (offset from the object) information, separate to the object it is attached to, and can be modified at runtime, enabling simple animation.

The engine 204 manages the AR objects that have been created, through the factory 212, by the controlling application, assigning each object with a unique identifier. Once created, the AR object can then be displayed in the position/location of the original object, overlaying the real-world scene on HMD see-through lenses, or overlaying camera video on a desktop/tablet device. As the object moves in the field of view the AR object associated therewith also moves and remains locked to the real-world object for at least as long as the real-world object is in the FOV. In addition, if there are other changes in the object as detected by the external sensors from time to time, the AR object is updated using its identifier to reflect the changes and to coincide therewith. For example, if an object providing a GPS location to the controlling application moves, so too will the AR object. If the object changes temperature for example, the symbology associated with the AR object will be updated to indicate a new temperature for the object.

The system remains aware of all active objects and tracks their position through the external sensors even when the object is not in the FOV. If the object or the user moves in a manner that the object re-enters the FOV the object is immediately recognised from the unique ID and the earlier symbology and addition information is re-drawn for display. The object remains active until there is an indication to no longer track the object at which point the respective AR object can be deleted Each AR object is represented graphically by one or more symbols in any combination of types and can optionally include one or more annotations. Symbol types include a primitive shape, generated by the shape generator 214, a pre-designed icon (e.g., NATO APP6 or MIL-STD-2525) created using the proprietary Mesmeric Symbol & Style Editor (MeSSE) tool, an image, or a video. Annotations are displayed in the style of the selected font, of which a number can be loaded during initialisation. Annotations can be used to display additional information relating to the object including one or more of: parameters, characteristics and the type of AR object itself, a position, a bearing and/or distance from the user, a name, or any other type of additional information. The additional information is further usable to distinguish the object from other objects so that each AR object is unique.

In addition to the formation of individual AR objects, AR objects may be combined to make compound objects. The compound objects are displayed and also stored as required.

The system includes an option of adding post-rendering warp layers. These are processed by the engine after all normal symbology rendering has taken place and provides functionality to correct for display surface aberrations such as lens distortion and colour channel separation. This is achieved by capturing the display, creating a polygon from a pre-configured set of nodes, and rendering the display as a texture on to the polygon surface.

Figure 3:
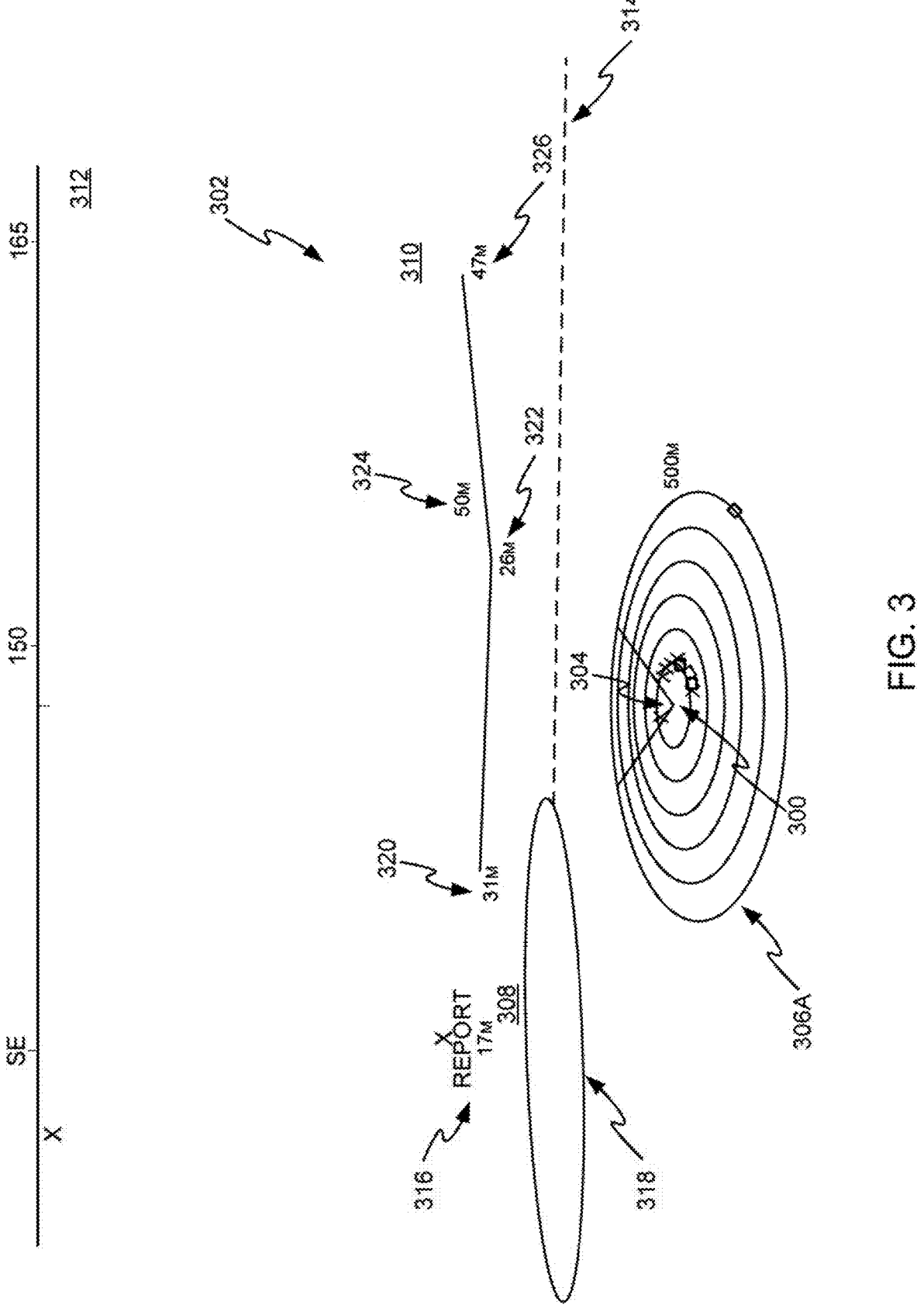
FIGS. 3, 4 and 5 show screen shots produced for the system of the present invention.
Figure 4:
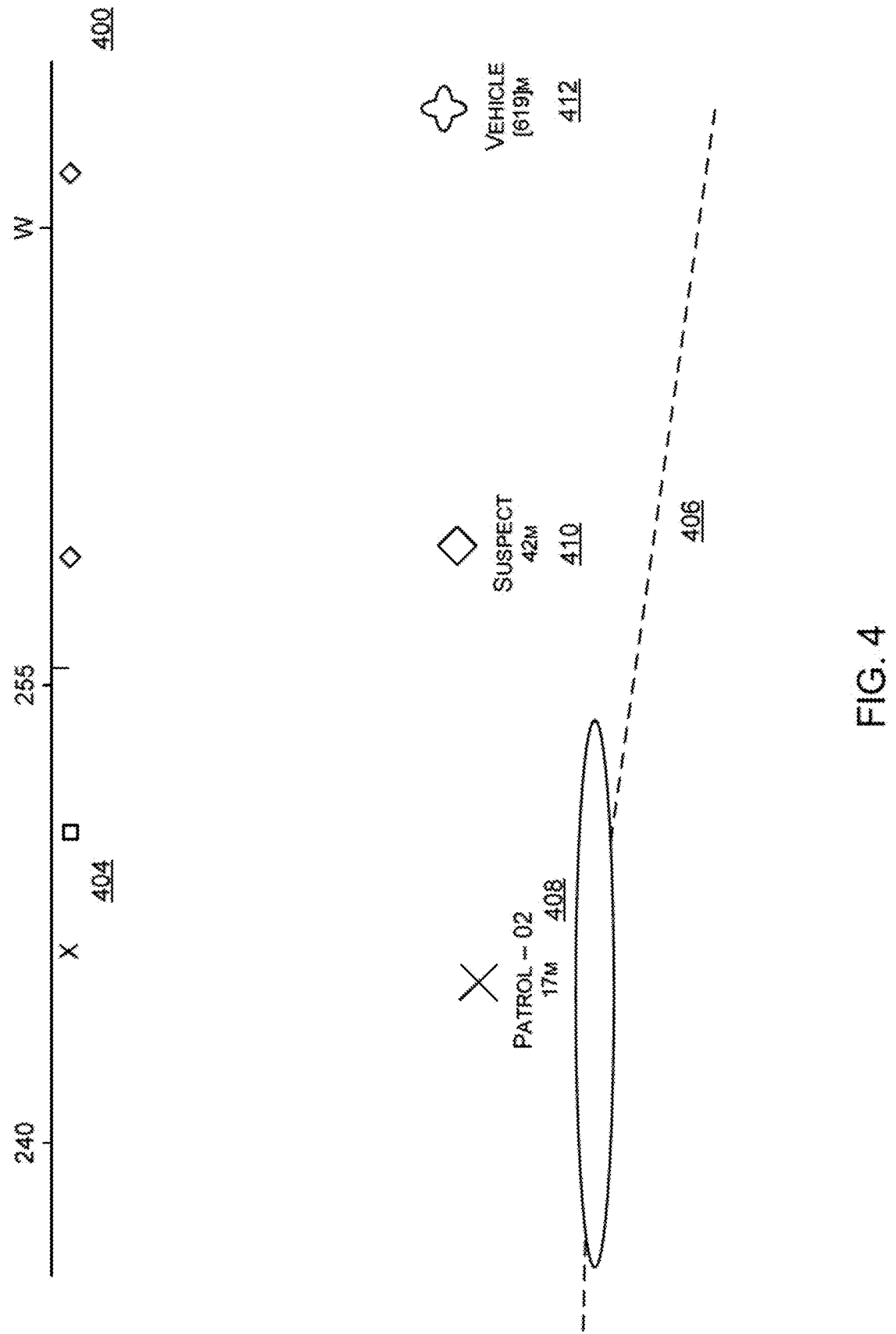
Figure 5:
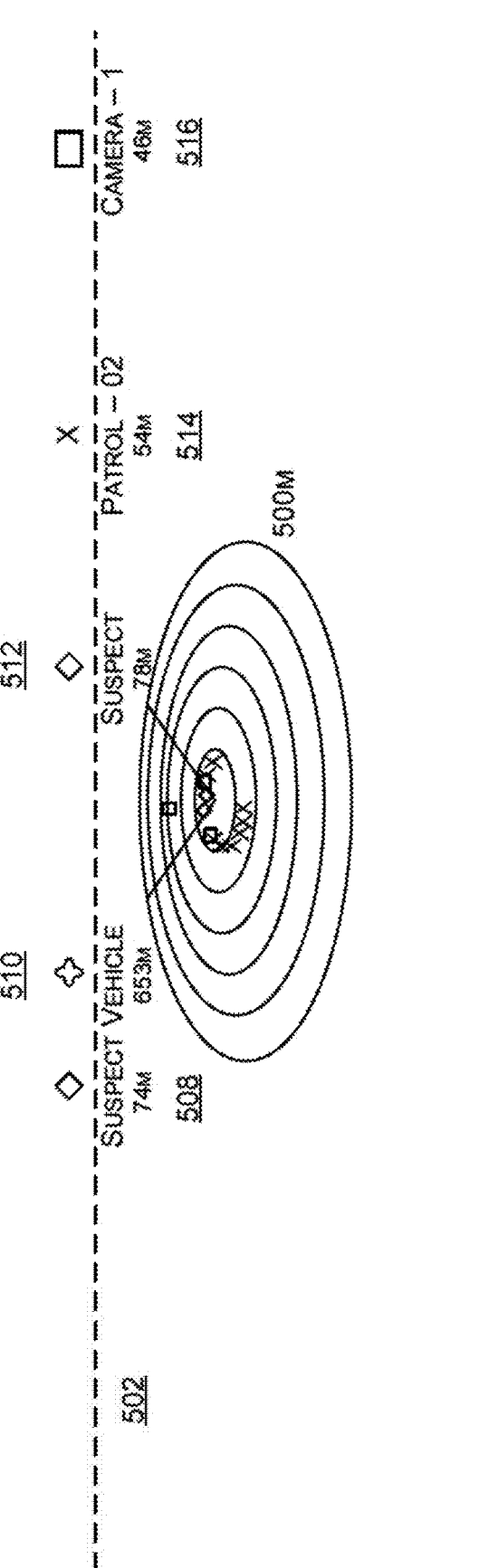

FIGS. 3 to 5 include screen representations of a screen shot of different scenes having different AR objects therein. The screen shots are captured from the application running the system in which the background on the display is actually transparent so that the AR objects are seen overlaid on the real-world objects based on regular position updates from any external sources.

Each of the AR objects in the view are generated by the system based on view, layers, symbology, annotations and the like. These are generated by the factory if they are new or managed by the engine if already generated on a previous occasion. In the case of layers, different types of layers are used for different situations as mentioned elsewhere.

In FIG. 3 there is a user (not shown) at a position 300 wearing a HMD (not shown) and viewing a real-world scene 302 over a FOV which is defined by the wedge shaped portion 304 of disc 306 which represents a 3D radar. A Body-Stabilised Layer is used to generate the radar 306. The radar 306 is centred on the user and each circle forming the disc represents a distance interval (100 metres) from the user. The outer ring (306A) of the radar is shown to be a distance of 500 metres. In the displayed scene, on a World-Stabilised Layer, there is an object 308 marked with an "X" and a 3D ground-stabilised disc 318, representing a way-point, including an annotation which indicates one or more details of the object (named 'REPORT' 316 at 17 metres away 308). In addition, the scene includes a representation of a wall 310 of a building in the real-world scene, comprised of four corners by respective objects 320, 322, 324, and 326 with the distance of each attached as a label. A heading tape 312 on a Head-Stabilised Layer indicates, in this case, the compass bearing of the HMD FOV centre and an "X" to indicate the bearing of the waypoint from the HMD. Objects are added to the system engine via the application from the sensors to represent situational awareness entities involved in an example simulated mission route 314. This simulation includes assets, such as an unmanned air vehicle (UAV), and possible suspect vehicles or persons, and a patrol route set up as a series of waypoint objects which are linked together using a compound object 314. It is possible that the wall could be used to indicate a simulated hazardous area, provided by an external simulated chemical sensor or any other type of feature which covers an area in the scene.

Once an AR object is in the FOV and is known, the object can be reproduced multiple times and situated in the correct position relative to the user and or other AR objects. In general, the object is displayed until it moves out of the FOV. If the object re-enters the FOV it will be displayed again and include all relevant data associated with the layer, view, object, symbology and annotations as the case may be. There are occasions when certain types of object are displayed even if they are outside the FOV, to indicate the direction the user must turn to be able to see a high-priority object, for example.

FIG. 4 shows a representation of a second screenshot including a selection of simulated objects. Each object added to the system has also been added to the heading tape 400 and radar containers (not shown) so that the symbols 404 also appear at a bearing from the user on the heading tape; and a bearing and relative distance on the radar. FIG. 4 also shows a continuation of a mission route 406 as a compound object with a patrol waypoint 408 along with two point objects 410, 412, representing a "suspect" and an unknown vehicle that have been spotted by one or more external sensors. This will constitute the last reported location of the object. The symbols displayed by this particular application use the NATO APP6 symbol set although any other symbol set can be used as the case may be, by drawing it using the MeSSE tool. The 3D Radar has been hidden in this representation by switching the Body-Stabilised Layer off.

FIG. 5 shows a representation of further point objects including a UAV 500 in the air and the mission route compound object 502. The radar 504 and a complex mission compound object are both shown in this view. This time, the heading tape has been hidden by switching off the Head-Stabilised Layer. The complex mission compound object comprises a route 506, a plurality of objects 508, 510, 512 and 514. Each object includes a name and a distance as shown in FIG. 3. The position of a camera 516 is also shown, simulating a tracking surveillance camera providing the locations of the suspects, along with images which are processed for view by the system as image or video symbols.

By adding and removing different AR objects the system is well adapted to give a comprehensive image of a real-world scene and AR objects which enable a clearer understanding of what is in the final image. Each layer can be formed independently from others and is overlayed to provide the details of the relevant AR object. As the FOV changes the relative positions of the objects are automatically recalculated and overlay is recreated with any updates that have occurred. The contents of individual AR objects remain the same unless there is an update from external sources or sensors at which time the AR object can be updated and re-displayed.

Figure 6:
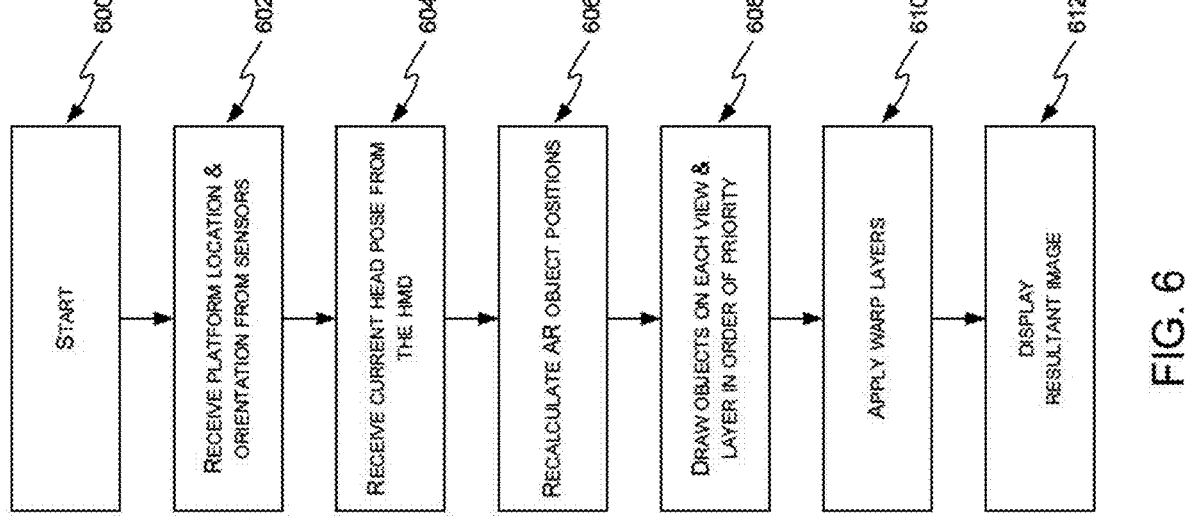
FIG. 6 is a flow diagram of update and rendering processes for the system.

The resultant display is created as set out in the flow chart of FIG. 6. At step 600 the process starts with the 'update' cycle initiated by the application supplying the platform location and orientation 602. Using the sensors in the HMD, the current head orientation and position is then received 604. From the two sets of sensor inputs, the AR object positions managed by the engine are recalculated 606. Each AR object is prepared for drawing in the order of the views and layer priorities created at initialisation, with rotations and/or scaling applied, and relevant symbology is applied thereto 608. The relevant symbology depends on the type of AR object and in some cases is a null. Any enabled warp layers are then applied to the scene to correct for lens distortion 610. Finally, the resultant image is output to the connected display/s 612.

The overlaying of AR objects in the real-world scene is carried out as follows: the different AR objects are of different types and the overlaying occurs independent of the AR object type and the activity intended by the user. For a particular type of activity, the predominate AR object type is not the same as for another activity. Accordingly, the predominant and any subsequent AR object types are determined based on the intended activity. As discussed above this can result in the header tape not being shown by switching off the Head-Stabilised Layer. Similarly, the 3D Radar is hidden by switching off the Body-Stabilised Layer.

The combinations of AR objects are endless and are easily retrieved and generated by the system and placed in the correct location relevant to other objects (AR or real) being shown in the display. Any changes to the FOV result in an updated display.

The video symbol and Head-Stabilised Layer is usable with great effect to render the output of a rear camera stream from a tablet device as the background layer, providing Augmented Reality without a see-through lens. The sensors on the tablet device provide the input for the "head" orientation, controlling the symbology layers or other AR objects while the camera stream renders to a full-screen video symbol.

The library includes a callback object which is able to identify a rectangular region, either defined as World-Stabilised latitude & longitude points or Head-Stabilised screen co-ordinates, that acts as the display output of another application, or a placeholder for a 3D mesh. For a 2D plane callback object, a digital map application is running in a separate process and rendering to a frame buffer which is then rendered as part of the AR display. A benefit of this approach is that the AR display continues to run at a high update frequency as is necessary to keep the graphics aligned with the real-world objects with fairly rapid head movements, while the update rate of the Callback Object is determined by the external application. Using this example, the AR device wearer would be able to see a map of their current (or indeed, any) location on the display without it significantly affecting the performance of the AR application.

In a further aspect a 3D model of a geographical area is made available as a 3D World-Stabilised callback object and shows a 3D representation of the area (e.g., outlining a group of buildings).

A further callback object includes a video which is displayable in a predetermined area of the display which is shown in conjunction with the real-world image and relevant AR objects.

The above has been described based on an HMD type display. It will be appreciated that other types of display are also relevant as mentioned above. The AR objects comprise any object which can exist within an AR environment and includes appropriate symbology as needed.

The invention is implemented using computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. An image generation system for displaying an Augmented Reality "AR" image of a real-world environment having one of more real-world objects located therein, the system comprising:
    a display on which the image of the real-world environment and one or more AR objects are displayed, the one or more AR objects each corresponding to a respective one of the one or more real-world objects; and
    a processing and control module configured to
        receive, from one or more sensors, data relating to the real-world environment and the one of more real-world objects therein;
        create each of the one or more AR objects from the corresponding real-world object by determining additional information relating to the corresponding real-world object which is represented by at least a symbol, an annotation, and/or a font to be attached to the corresponding AR object to act as a displayed component; and
        display the AR image comprising the real-world environment and the one or more AR objects;
        wherein each of the one or more AR objects once created is stored for future retrieval based on a unique identifier for the corresponding AR object, and each of the one or more AR objects remains active as long as the corresponding real-world object is of interest, and
        wherein at least one of the one or more AR objects is associated with at least one layer, and wherein the at least one layer includes a world-stabilised layer or a platform/body-stabilised layer.

2. The system according to claim 1, wherein responsive to a stored AR object entering a Field Of View "FOV" of the display, the stored AR object is displayed, on the display, based on the corresponding unique identifier.

3. The system according to claim 1, wherein at least one of the one or more AR objects is represented in the AR image by just the additional information.

4. The system according to claim 1, wherein the real-world environment is displayed with the one or more AR objects, and each of the one or more AR objects is positioned to coincide with the corresponding real-world object.

5. The system according to claim 4, wherein the one or more AR objects include multiple AR objects.

6. The system according to claim 1, wherein at least one of the one or more AR objects is associated with a display surface.

7. The system according to claim 6, wherein at least one of the display surface or the at least one layer is overlayed on an image of the real-world environment to form an AR image.

8. The system according to claim 6, wherein the display surface comprises a display screen onto which multiple layers are added.

9. The system according to claim 8, wherein the multiple layers are containers for objects and are added to the display surface in any order and in any quantity.

10. The system according to claim 8, wherein the multiple layers include one of: a world-stabilised layer; a platform/body-stabilised layer; and a display/head-stabilised layer.

11. The system according to claim 1, comprising a 3D terrain layer, having associated therewith at least one of the one or more AR objects for representing a terrain mesh.

12. The system according to claim 11, wherein the at least one of the one or more AR objects for representing the terrain mesh comprises an array of discrete AR tile elements, and wherein the processing and control module is configured to select AR tiles for presentation according to the position of the user.

13. A method for displaying an Augmented Reality "AR" image of a real-world environment having one of more real-world objects located therein, the method comprising:

displaying an image of the real-world environment and one or more AR objects, the one or more AR objects each corresponding to a respective one of the one or more real-world objects;

receiving, from one or more sensors, data relating to the real-world environment and the one of more real-world objects therein;

creating each of the one or more AR objects from a corresponding one of the one or more real-world objects by determining additional information relating to the corresponding real-world object which is represented by a symbol, an annotation, and/or a font to be attached to the corresponding AR object to act as a displayed component; and displaying the AR image comprising the real-world environment and the one or more AR objects;

wherein each of the one or more AR objects once created is stored for future retrieval based on a unique identifier for the corresponding AR object, and each of the one or more AR objects remains active as long as the corresponding real-world object is of interest, and wherein at least one of the one or more AR objects is associated with at least one layer, and wherein the at least one layer includes a world-stabilised layer or a platform/body-stabilised layer.

14. The method according to claim 13, comprising displaying a stored AR object based on the unique identifier when the stored AR object enters a Field Of View "FOV" of the display.

15. The method according to claim 13, comprising representing at least one of the one or more AR objects in the AR image by just the additional information.

16. The method according to claim 13, comprising displaying the real-world environment with the one or more AR objects, with each of the one or more AR objects positioned to coincide with the corresponding real-world object.

17. The method according to claim 13, comprising forming at least one of the one or more AR objects with a display surface.

18. An image generation system for displaying an Augmented Reality "AR" image of a real-world environment having one of more real-world objects located therein, the system comprising:

a display on which an image of the real-world environment can be provided, and onto which multiple layers can be added, the multiple layers including a world-stabilised layer, a platform/body-stabilised layer, a display/head-stabilised layer, and a 3D terrain layer, at least one of the layers associated with at least one AR object corresponding to a respective one of the one or more real-world objects; and a processing and control module configured to receive, from one or more sensors, data relating to the real-world environment and the one of more real-world objects therein, create the at least one AR object from the corresponding real-world object by determining additional information relating to the corresponding real-world object which is represented by at least a symbol, an annotation, and/or a font to be attached to the at least one AR object to act as a displayed component, and display the AR image comprising the image of the real-world environment and the at least one AR object, wherein the at least one AR object once created is stored for future retrieval based on a unique identifier for the at least one AR object, and the at least one AR object remains active as long as the corresponding real-world object is of interest.

19. The system according to claim 18, wherein the display is transparent, such that the real-world environment can be seen by a user looking through the display.

20. The system according to claim 18, wherein:

the world-stabilised layer includes an AR object that (1) is rendered with respect to a specified field of view of the display, and (2) overlays the represented position of the corresponding real-world object;

the platform/body-stabilised layer includes an AR object that is rendered relative to the position of a user location;

the display/head-stabilised layer includes an AR object that remains on the display regardless of where the user is looking; and the 3D terrain layer includes an AR object representing terrain.

* * * * *